United States Patent [19]
Ohsawa et al.

[11] Patent Number: 6,140,414
[45] Date of Patent: Oct. 31, 2000

[54] AQUEOUS SILICONE EMULSION AND BASE CLOTH FOR AIR BAGS TREATED THEREWITH

[75] Inventors: Yoshihito Ohsawa; Yoshinobu Takahashi; Satoshi Kuwata, all of Matsuida-machi, Japan

[73] Assignee: Shin-Etsu Chemical Co., Ltd., Tokyo, Japan

[21] Appl. No.: 09/354,588

[22] Filed: Jul. 16, 1999

[30] Foreign Application Priority Data

Jul. 16, 1998 [JP] Japan .................................. 10-202163

[51] Int. Cl.⁷ ......................... C08L 83/07; C09D 183/07
[52] U.S. Cl. ........................ 524/838; 524/588; 428/35.5; 428/36.1; 442/104; 442/136; 427/387; 106/287.11
[58] Field of Search ..................... 524/838, 588; 442/104, 136; 428/36.1, 35.5; 427/387; 106/287.11

[56] References Cited

U.S. PATENT DOCUMENTS

| | | | |
|---|---|---|---|
| 5,254,621 | 10/1993 | Inoue et al. | 524/837 |
| 5,705,445 | 1/1998 | Chikaraishi et al. | 442/104 |
| 5,827,921 | 10/1998 | Osawa et al. | 524/837 |

FOREIGN PATENT DOCUMENTS

| | | |
|---|---|---|
| 535649 | 4/1993 | European Pat. Off. . |
| 702106 | 3/1996 | European Pat. Off. . |

*Primary Examiner*—Margaret G. Moore
*Attorney, Agent, or Firm*—Millen, White, Zelano & Branigan, P.C.

[57] ABSTRACT

Disclosed is a novel curable silicone-based aqueous emulsion composition suitable as a surface-coating composition for an air bag base cloth and capable of exhibiting excellent adhesion to the substrate cloth and imparting the surface-coated cloth with excellent flexibility and flame retardancy. The aqueous silicone emulsion composition is a uniform blend which comprises:

(A) 100 parts by weight of an aqueous base emulsion of an organopolysiloxane consisting of
  (A1) from 10 to 70% by weight of an organopolysiloxane having at least two hydroxyl groups bonded to the silicon atoms in a molecule, in which from 0.01 to 10% by moles of the monovalent hydrocarbon groups are alkenyl groups,
  (A2) from 0.01 to 10% by weight of an anionic surface active agent, and
  (A3) the balance of water;
(B) from 1 to 60 parts by weight of an aqueous dispersion consisting of
  (B1) from 5 to 50% by weight of a solution containing, in an at least partly water-miscible organic solvent, from 10 to 90% by weight of a reaction product between an amino group-containing hydrolyzable organosilane compound or a partial hydrolysis product thereof and a polycarboxylic acid anhydride, and
  (B2) from 50 to 95% by weight of an aqueous colloidal silica dispersion containing from 10 to 50% by weight of colloidal silica particles; and
(C) from 0.01 to 10 parts by weight of a curing catalyst.

34 Claims, No Drawings

AQUEOUS SILICONE EMULSION AND BASE CLOTH FOR AIR BAGS TREATED THEREWITH

BACKGROUND OF THE INVENTION

The present invention relates to an aqueous emulsion composition of silicone or, more particularly, to an aqueous emulsion composition of a crosslinkable silicone suitable for use as a surface coating agent in the preparation of a base cloth for automobile air bags as well as to a base cloth for air bags surface-coated with the aqueous emulsion composition of silicone.

A great variety of aqueous emulsion compositions of a crosslinkable silicone, which can give a film of a cured silicone rubber, are known in the prior art and widely employed in the surface treatment of a substrate cloth for preparing a base cloth of air bags for emergency cushioning in automobiles. Some of them are as follows.

(1) Japanese Patent Kokai 56-16553 discloses an anionically stabilized aqueous silicone emulsion having a pH value of 9.0 to 11.5 containing a diorganopolysiloxane having silanolic hydroxyl groups, colloidal silica and an organotin compound or an amine compound.

(2) Japanese Patent Kokai 54-131661 discloses an organopolysiloxane latex composition prepared by the emulsion polymerization of a cyclic organopolysiloxane oligomer and a functional group-containing organo trialkoxy silane compound such as an aminoalkyl trialkoxy silane in combination in an aqueous medium in the presence of a surface active agent which is a sulfonic acid-based compound or a quaternary ammonium salt compound.

(3) U.S. Pat. No. 3,817,894 discloses a silicone latex composition consisting of an organopolysiloxane block copolymer composed of dimethylsiloxane units and monophenyl siloxane units, water, cationic surface active agent, filler and aminosilane compound.

(4) Japanese Patent Kokai 8-85760 discloses an aqueous silicone emulsion composition comprising an organopolysiloxane having silanolic hydroxyl groups, organopolysiloxane having silicon-bonded hydrogen atoms, colloidal silica, organosilane compound having an amide group and carboxyl group in the molecule, organosilane compound having an epoxy group in the molecule and curing catalyst.

(5) Japanese Patent Kokai 9-208826 discloses an aqueous silicone emulsion composition containing an organopolysiloxane having alkenyl groups in the molecule, organopolysiloxane having silicon-bonded hydrogen atoms in the molecule, colloidal silica, reaction product of an aminosilane compound and acid anhydride compound, epoxy-containing organosilane compound and catalytic compound for promoting the hydrosilation reaction between the alkenyl groups and silicon-bonded hydrogen atoms.

(6) Japanese Patent Kokai 9-208900 discloses an aqueous silicone emulsion composition comprising an organohydrogenpolysiloxane end-blocked with hydroxyl groups, surface active agent as an emulsifier, water and curing catalyst.

(7) Japanese Patent Kokai 9-208901, 9-208902 and 9-208903 each disclose an aqueous silicone emulsion composition comprising core-shell particles of a colloidal silica particles and a silicone, curing catalyst, surface active agent as an emulsifier and water.

(8) Japanese Patent Kokai 60-22018 and Japanese Patent No. 2590649 each disclose an aqueous silicone emulsion composition comprising an organopolysiloxane having silanolic hydroxyl groups in the molecule, colloidal silica, reaction product of an aminosilane compound and an acid anhydride compound and curing catalyst.

None of the above described aqueous silicone emulsion compositions in the prior art are, however, quite satisfactory when used as a surface coating agent of a base cloth as a material of air bags in respect of adhesion of the cured silicone films to the substrate cloth and flame retardancy as essential properties to be imparted to the surface-treated base cloth although the surface-treated air bag base cloths proposed by the inventors in Japanese Patent Kokai 8-85405 and 8-208826 have flame retardancy improved to some extent over conventional air bag base cloths.

SUMMARY OF THE INVENTION

The present invention accordingly has an object to provide a novel and improved aqueous silicone emulsion composition capable of being crosslinked to give a film of a cured silicone rubber and suitable for use as a surface coating agent of a base cloth of air bags free from the above mentioned deficiencies in the conventional aqueous emulsion composition of a curable silicone as well as to provide a base cloth of air bags surface-treated with the aqueous silicone emulsion composition. In particular, the present invention has been completed as a result of the extensive investigations to develop an aqueous silicone emulsion composition capable of giving a cured silicone rubber film which exhibits excellent adhesion to the surface of the substrate cloth imparting good flexibility to the base cloth irrespective of the fiber material of the substrate cloth which may be one of natural fibers or synthetic fibers along with high flame retardancy imparted to the surface-treated air bag base cloth.

Thus, the aqueous silicone emulsion composition of the present invention is a uniform blend which comprises:

(A) 100 parts by weight of an aqueous base emulsion of an organopolysiloxane consisting of
  (A1) from 10 to 70% by weight of an organopolysiloxane having at least two hydroxyl groups directly bonded to the silicon atoms in a molecule, in which from 0.01 to 10% by moles of the monovalent hydrocarbon groups bonded to the silicon atoms are alkenyl groups,
  (A2) from 0.01 to 10% by weight of an anionic surface active agent, and
  (A3) the balance of water;

(B) from 1 to 60 parts by weight of an aqueous dispersion consisting of
  (B1) from 5 to 50% by weight of a solution containing, in an at least partly water-miscible organic solvent, from 10 to 90% by weight of a reaction product between an amino group-containing hydrolyzable organosilane compound or a partial hydrolysis product thereof and a polycarboxylic acid anhydride, and
  (B2) from 50 to 95% by weight of an aqueous colloidal silica dispersion containing from 10 to 50% by weight of colloidal silica particles; and (C) from 0.01 to 10 parts by weight of a curing catalyst.

DETAILED DESCRIPTION OF THE PREFERRED EMBODIMENTS

As is described above, the aqueous silicone emulsion composition of the present invention is a uniform blend of the ingredients (A), (B) and (C), of which the ingredient (A) is an aqueous base emulsion of an organopolysiloxane consisting of the components (A1), (A2) and (A3), the ingredient (B) is an aqueous dispersion consisting of the components (B1) and (B2) and the ingredient (C) is a curing catalyst. Each of these ingredients and components thereof are described in detail in the following.

The component (A1) forming the ingredient (A) is an organopolysiloxane having silicon-bonded monovalent hydrocarbon groups and at least two silanolic hydroxyl groups bonded to the silicon atoms in a molecule, of which from 0.01 to 10% by moles of the monovalent hydrocarbon groups bonded to the silicon atoms are alkenyl groups such as vinyl and allyl groups. The monovalent hydrocarbon groups other than the above mentioned alkenyl groups each preferably have 1 to 20 carbon atoms exemplified by alkyl groups such as methyl, ethyl, propyl, butyl, pentyl, hexyl, heptyl, octyl, nonyl, decyl, dodecyl, tetradecyl, hexadecyl, octadecyl and eicosyl groups, cycloalkyl groups such as cyclopentyl, cyclohexyl and cycloheptyl groups and aryl groups such as phenyl and tolyl groups as well as those substituted groups obtained by replacing a part or all of the hydrogen atoms in the above named hydrocarbon groups with substituents such as halogen atoms, carboxyl groups, epoxy groups, (meth)acryloxy groups, mercapto groups and cyano groups. Although any of these unsubstituted and substituted monovalent hydrocarbon groups can be contained in the organopolysiloxane either singly or as a combination of two kinds or more, it is preferable that at least 50% by moles of the silicon-bonded monovalent hydrocarbon groups are methyl groups.

The alkenyl groups in the organopolysiloxane as the component (A1) each preferably have from 2 to 6 carbon atoms as exemplified by vinyl, allyl, butenyl, pentenyl and hexenyl groups, of which vinyl groups are particularly preferable. When the alkenyl group has 7 or more carbon atoms, no good flame retardancy can be imparted to the air bag base cloth surface-treated with the aqueous silicone emulsion composition.

The relative molar content of the alkenyl groups to the overall content of monovalent hydrocarbon groups in the organopolysiloxane as the component (A1) is in the range from 0.01 to 10% by moles or, preferably, from 0.05 to 5% by moles or, more preferably, from 0.1 to 2% by moles. When the molar content of alkenyl groups is too low, no good flame retardancy can be imparted to the air bag base cloth surface-treated with the aqueous silicone emulsion composition while no further improvement can be obtained in the flame retardancy by the use of an organopolysiloxane of which the molar content of alkenyl groups is further increased to exceed the above mentioned upper limit.

Though not essential, the organopolysiloxane as the component (A1) has a viscosity of at least 100,000 centipoise or, preferably, at least 1,000,000 centipoise at 25° C. When the viscosity of the organopolysiloxane is too low, the flame retardancy imparted to the air bag base cloth cannot be high enough after the surface treatment with the aqueous silicone emulsion composition.

The organopolysiloxane as the component (A1) described above can be prepared according to a known procedure by the polymerization reaction of starting materials such as cyclic organopolysiloxane oligomers, alkenyl group-containing cyclic organopolysiloxane oligomers, α,ω-dihydroxy diorganopolysiloxanes, alkyl trialkoxy silane compounds, alkenyl trialkoxy silane compounds and the like.

The component (A2) forming the ingredient (A) is an anionic surface active agent which can be selected from various kinds of known ones. Examples of preferable anionic surface active agents include organic sulfonates, higher alcohol sulfates, ethoxylated higher alcohol sulfates, alkylphenyl ether sulfates, ethoxylated alkylphenyl ether sulfates, higher alcohol phosphates, ethoxylated higher alcohol phosphates and others.

The aqueous base emulsion of silicone as the ingredient (A) is prepared preferably by the method of emulsion polymerization of the above mentioned starting organosilicon compounds in an aqueous medium. Namely, the starting organosilicon compound or a combination of organosilicon compounds is emulsified in an aqueous solution of an anionic surface active agent in an acid form and subjected to the acid-catalyzed polycondensation reaction followed by the addition of an alkaline compound so as to bring the pH of the aqueous emulsion to 4 to 9. The surface active agent in the acid form is neutralized by the alkaline compound into a corresponding non-acid anionic surface active agent.

The aqueous base emulsion of silicone as the ingredient (A) prepared in the above described manner contains the organopolysiloxane as the component (A1) in an amount in the range from 10 to 70% by weight or, preferably, from 30 to 60% by weight. When the content of the organopolysiloxane as the component (A1) is too low, the stability of the emulsion is adversely affected while, when the content thereof is too high, a difficulty is encountered in the coating works of the air bag base cloth with the aqueous silicone emulsion composition. On the other hand, the content of the anionic surface active agent as the component (A2) in the aqueous base emulsion is in the range from 0.01 to 10% by weight or, preferably, from 0.1 to 5% by weight. When the amount of the surface active agent is too small, the aqueous emulsion cannot be fully stable while, when the amount of the surface active agent is too large, the surface-treated air bag base cloth cannot be imparted with fully improved flame retardancy.

It is of course optional that the aqueous base emulsion of silicone as the ingredient (A) is further admixed with various kinds of known additives including non-ionic and amphoteric surface active agents, buffering agent for pH control, antiseptic agents, rustproofing agents, coloring agents, e.g., dyes and pigments, and others each in a limited amount.

The component (B1) constituting the ingredient (B) of the inventive silicone emulsion composition is a product obtained by the reaction in a medium of an at least partly water-miscible organic solvent between a hydrolyzable organosilane compound having an amino group or a partial hydrolysis product of the silane compound and a polycarboxylic acid anhydride. The amino group-containing hydrolyzable organosilane compound is represented by the general formula $$R^1_m R^2_n Si(OR^3)_{4-m-n}, \quad (I)$$

In which $R^1$ is an unsubstituted or N-substituted aminoalkyl group represented by the general formula —(—$CH_2$—)$_a$—(—$NR^4$—$CH_2CH_2$—)$_b$—$NR^5R^6$, $R^4$, $R^5$ and $R^6$ each being, independently from the others, a hydrogen atom or a monovalent hydrocarbon group having 1 to 10 carbon atoms with the proviso that at least one of $R^4$, $R^5$ and $R^6$ is a hydrogen atom, the subscript a being a positive integer not exceeding 6 and the subscript b being 0 or a positive integer not exceeding 3, $R^2$ is a monovalent hydrocarbon group having 1 to 20 carbon atoms, $R^3$ is a monovalent hydrocarbon group having 1 to 6 carbon atoms, the subscript m is 1, 2 or 3 and the subscript n is 0, 1 or 2 with the proviso that m+n is 1, 2 or 3.

Examples of particular amino group-containing hydrolyzable organosilane compounds according to the above given definition include: 3-aminopropyltriethoxysilane; 3-(2-aminoethyl)aminopropyltrimethoxysilane; 3-[2-(2-aminoethyl)aminoethyl]aminopropyltrimethoxysilane; 3-aminopropylmethyldiethoxysilane; 3-(2-aminoethyl) aminopropylmethyldimethoxysilane; 3-[2-(2-aminoethyl) aminoethyl]aminopropylmethyldimethoxysilane and the like.

The polycarboxylic acid anhydride to be reacted with the above described amino group-containing hydrolyzable organosilane compound or a partial hydrolysis product thereof includes anhydrides derived from di-, tri and tetracarboxylic acids such as maleic anhydride, succinic anhydride, glutaric anhydride, phenylmaleic anhydride, chlorendic anhydride, phthalic anhydride, hexahydrophthalic anhydride, trimellitic anhydride and pyromellitic anhydride, of which dicarboxylic acid anhydrides are preferable and maleic anhydride is more preferable.

The reaction of the amino group-containing hydrolyzable organosilane compound or a partial hydrolysis product thereof and the polycarboxylic acid anhydride is conducted in such a proportion of the reactants that from 0.5 to 2 moles of amino groups are provided by the former reactant per mole of the latter reactant. The reaction readily proceeds at room temperature or under heating in a mixture of the reactants optionally diluted with an at least partly water-miscible organic solvent. When the reaction is conducted in a solution with such an organic solvent, the reaction product is obtained also in the form of a solution which can be used as such as the component (B1) to be mixed with the component (B2) to form the ingredient (B).

The above mentioned at least partly water-miscible organic solvent is exemplified by alcohols such as methyl, ethyl, isopropyl and butyl alcohols, ketones such as acetone and methyl ethyl ketone, acetonitrile, tetrahydrofuran and the like. The amount of the organic solvent, when used, should be such that the concentration of the reaction product between the silane compound and the anhydride compound in the solution is in the range from 10 to 90% by weight or, preferably, from 30 to 70% by weight. When the amount of the organic solvent is too large, an economical disadvantage is resulted due to an excessively large volume of the solution to be mixed with the component (B2). When the amount of the organic solvent is too small, a trouble may eventually be encountered due to a decrease in the stability of the solution.

The component (B2) to be mixed together with the component (B1) described above is an aqueous dispersion of colloidal silica particles having a particle diameter in the range from 5 to 50 nm as stabilized by the addition of aluminum ions or ammonium ions. Various grades of commercial products containing 10 to 50% by weight of colloidal silica particles are available as such an aqueous dispersion of colloidal silica particles including Snowtex (a product by Nissan Chemical Co.), Ludox (a product by Du Pont Co.), Silicadol (a product by Nippon Kagaku Kogyo Co.), Adelite AT (a product by Asahi Denka Kogyo Co.) and Cataloid S (a product by Shokubai Kasei Kogyo Co.), which can be used as such as the component (B2).

The content of colloidal silica particles in the above mentioned aqueous dispersion is preferably in the range from 10 to 50% by weight or, more preferably, from 20 to 40% by weight. When an aqueous dispersion of which the content of colloidal silica particles is too low is used as the component (B2), the amount of the colloidal silica particles in the resultant silicone emulsion composition cannot be large enough so that the air bag base cloth surface-treated with the silicone emulsion composition cannot be imparted with fully improved flame retardancy. When the content of colloidal silica particles is too high in the aqueous colloidal silica dispersion, a trouble may eventually be resulted due to a decrease in the stability of the aqueous dispersion.

The ingredient (B), which is a mixture of the above described components (B1) and (B2), is prepared by mixing from 5 to 50% by weight of the component (B1) and from 95 to 50% by weight of the component (B2) or, preferably, from 10 to 30% by weight of the component (B1) and from 90 to 70% by weight of the component (B2). When the proportion of the component (B1) is too low, the adhesion between the dried film of the silicone emulsion composition and the substrate cloth for the air bag base cloth cannot be high enough along with a decrease in the stability of the silicone emulsion composition as a consequence of the increase in the amount of the component (B2). When the proportion of the component (B1) is too high, on the other hand, the ingredient (B) as a mixture of the components (B1) and (B2) suffers a decrease in the stability along with insufficient flame retardance imparted to the air bag base cloth after a surface treatment with the silicone emulsion composition.

It is essential in the preparation of the inventive silicone emulsion composition that the components (B1) and (B2) are mixed together beforehand to give the ingredient (B) as a uniform mixture before blending with the other ingredients (A) and (C) since otherwise, I.e. if the components (B1) and (B2) are separately blended with the other ingredients, the aqueous silicone emulsion cannot be fully uniform. The amount of the ingredient (B) in the inventive aqueous silicone emulsion composition is in the range from 1 to 60 parts by weight or, preferably, from 10 to 50 parts by weight per 100 parts by weight of the ingredient (A). When the amount of the ingredient (B) is too small, the air bag base cloth after surface treatment with the silicone emulsion composition cannot be Imparted with fully improved flame retardancy while, when the amount thereof is too large, the air bag base cloth after surface treatment with the silicone emulsion composition is defective in respect of flexibility.

The ingredient (C), which is blended with the above described ingredients (A) and (B) to give the inventive aqueous silicone emulsion composition, is a curing catalyst to promote the crosslinking reaction in the components of the composition. Examples of suitable curing catalyst compounds include metal salts of organic acids such as dibutyltin dilaurate, dibutyltin dioctoate, dioctyltin dilaurate, dioctyltin diacetate, tin octoate, zinc stearate, zinc octoate, zinc acetate and iron octoate and amine compounds such as n-hexylamine and guanidine.

When a water-insoluble compound is used as the ingredient (C), it is advantageous that the compound is added in the form of an aqueous emulsion.

The amount of the curing catalyst as the ingredient (C) in the inventive aqueous silicone emulsion composition is in the range from 0.01 to 10 parts by weight or, preferably, from 0.1 to 5 parts by weight per 100 parts by weight of the ingredient (A). When the amount of the curing catalyst is too small, full curing of the coating film of the silicone emulsion composition on a substrate cloth for the air bag base cloth cannot be accomplished not to impart a high mechanical strength to the cured silicone rubber film on the cloth. When the amount of the curing catalyst is too large, on the other hand, the cured silicone rubber film in the air bag base cloth naturally contains an unduly large amount of the catalyst compound after curing of the composition adversely affecting the properties of the cured silicone rubber film of the air bag base cloth or, in particular, decreasing the durability of the air bag prepared from the base cloth.

It is further optional with an object to improve the properties of the cured silicone rubber film formed from the inventive silicone emulsion composition on a substrate cloth for air bag base cloth that the inventive aqueous silicone emulsion composition is admixed with various kinds of known additives such as silane coupling agents, silicone resins in the form of a liquid or powder and silicone oils each in a limited amount.

The above mentioned silane coupling agent is an organosilane compound having a functional group in the molecule such as epoxy, (meth)acryloxy, mercapto, carboxyl and cyano groups. The silicone resins mentioned above include trialkylsiloxy polysilicates and polyalkyl silsesquioxane resins and the silicone oil includes dialkylpolysiloxanes and alkylhydrogenpolysiloxanes.

Besides the above mentioned silicone-based additives, the inventive aqueous silicone emulsion composition can be admixed according to need with other known additives such as thickening agents, pigments, dyes, penetrants, antistatic agents, antifoam agents and antiseptic agents.

Though not particularly limitative, the fiber material of the substrate cloth, from which an air bag base cloth is prepared by a surface coating treatment with the inventive silicone emulsion composition, is selected preferably from synthetic fibers such as polyamide fibers, polyester fibers, acrylic fibers and aramid fibers in respects of the high mechanical strength and heat resistance of these fibers as compared with natural fibers. The substrate cloth is preferably a plain-woven cloth obtained from these fibers in the form of filaments, spun yarns or a combination thereof.

The air bag base cloth according to the invention can be prepared by coating a substrate cloth with the inventive aqueous silicone emulsion composition followed by drying and curing of the coating layer. The method for coating of the substrate cloth with the emulsion composition is not particularly limitative and can be selected from conventional methods including knife coating, roller coating, spray coating and dip coating. The substrate cloth can be provided with a coating layer of the emulsion composition either on a single surface or on both of the surfaces. When the surface-treated air bag base cloth is required to have particularly good flexibility, the substrate cloth is coated with the emulsion composition on a single surface, preferably, by the method of knife coating or roller coating. The coating layer of the emulsion composition on the substrate cloth is then dried and subjected to curing of the dried coating layer. This drying and curing treatment can be undertaken at room temperature but it is usually advantageous to conduct the treatment at an elevated temperature in order to improve the productivity of the process to obtain a cured coating film having rubbery elasticity.

It is sometimes advantageous that the inventive aqueous silicone emulsion composition used in the preparation of an air bag base cloth is imparted with an increased viscosity before the coating work on a substrate cloth in order to ensure good performance of the air bag base cloth because, when the viscosity of the coating liquid is inadequately low, the coating liquid applied to the surface of the substrate cloth infiltrates the texture of the substrate cloth throughout and is cured in situ so that the surface-coated base cloth would have unduly high stiffness not suitable as a material of air bags along with problems relative to the gas-sealing behavior and flame retardancy of the base cloth although a coating liquid having an unduly high viscosity is disadvantageous due to a decrease in the coating workability to accomplish uniform coating along with an unduly increased coating amount of the coating liquid deposited on the substrate cloth leading to a disadvantageous increase in stiffness of the surface-coated base cloth. In this regard, the inventive aqueous silicone emulsion composition to be used in the preparation of an air bag base cloth should have a viscosity in the range from 2,000 to 100,000 centipoise or, preferably, from 10,000 to 50,000 centipoise at the coating temperature or at 25° C. The aqueous coating liquid can be imparted with an increased viscosity by dissolving therein a water-soluble polymeric thickening agent exemplified by carboxymethylcellulose, poly(sodium acrylate), starch, casein, cellulose acetate, hydroxyethyl cellulose and polyvinyl alcohol, of which carboxymethylcellulose is preferable in respect of coating workability.

The coating amount in the surface-coated air bag base cloth of the invention with the aqueous silicone emulsion composition is in the range from 10 to 100 $g/m^2$ or, preferably, from 20 to 50 $g/m^2$ calculated on the solid basis after drying of the coating layer. When the coating amount is too small, the flame retardancy of the base cloth cannot be fully improved. An unduly large coating amount is, on the other hand, disadvantageous in respect of the flexibility of the base cloth and increased weight not to comply with the requirement for lightweight air bags.

In the following, the present invention is described in more detail by way of Examples, which, however, never limit the scope of the invention in any way, as preceded by Preparatory Examples describing preparation of the respective ingredients used in the preparation of the aqueous silicone emulsion compositions. In the following description, the term of "%" always refers to "% by weight".

PREPARATORY EXAMPLE 1

Into a polyethylene beaker of 2 liters capacity were introduced 479 g of octamethylcyclotetrasiloxane, 5 g of phenyltriethoxysilane, 17 g of 1,3,5,7-tetramethyl-1,3,5,7-tetravinylcyclotetrasiloxane and 100 g of a 10% aqueous solution of dodecylbenzenesulfonic acid and the mixture in the beaker was agitated with a homomixer to give a uniform emulsion which was then diluted by gradually adding 400 g of water under agitation. The thus diluted emulsion was passed twice through a high-pressure homogenizer under a pressure of 300 $kg/cm^2$ to give a uniform and stable aqueous emulsion.

This aqueous emulsion was transferred into a glass flask of 2 liters capacity equipped with a stirrer, thermometer and reflux condenser and agitated therein for 24 hours at 50° C. to effect polymerization followed by aging for 24 hours at 10° C. and neutralization by the addition of 5.7 g of a 10% aqueous ammonia to give a pH value of 7.5. The thus obtained aqueous emulsion is referred to as the emulsion [A1] hereinafter.

This emulsion [A1] contained 45.5% of non-volatile matters as determined by heating for 3 hours at 105° C. in a hot-air oven. The organopolysiloxane constituent in the emulsion [A1], which had nonflowable soft gel-like consistency, consisted of the $Me_2SiO_{2/2}$ units, $MeViSiO_{2/2}$ units and $PhSiO_{3/2}$ units, Me, Vi and Ph being a methyl, vinyl and phenyl group, respectively, in a molar ratio of 100:3.0:0.3 corresponding to 1.5% by moles of the vinyl groups in the total content of methyl, vinyl and phenyl groups. The molecular chain ends of this organopolysiloxane could be assumed to be blocked each with a silanolic hydroxyl group.

PREPARATORY EXAMPLE 2

Into a polyethylene beaker of 2 liters capacity were introduced 497 g of octamethylcyclotetrasiloxane, 3 g of vinyltrimethoxysilane and 100 g of a 10% aqueous solution of dodecylbenzenesulfonic acid and the mixture in the beaker was agitated with a homomixer to give a uniform emulsion which was then diluted by gradually adding 400 g of water under agitation. The thus diluted emulsion was passed twice through a high-pressure homogenizer under a pressure of 300 kg/cm² to give a uniform and stable aqueous emulsion.

This aqueous emulsion was transferred into a glass flask of 2 liters capacity equipped with a stirrer, thermometer and reflux condenser and agitated therein for 24 hours at 50° C. to effect polymerization followed by aging for 24 hours at 10° C. and neutralization by the addition of 5.7 g of a 10% aqueous ammonia to give a pH value of 7.5. The thus obtained aqueous emulsion is referred to as the emulsion [A2] hereinafter.

This emulsion [A2] contained 45.8% of non-volatile matters as determined by heating for 3 hours at 105° C. in a hot-air oven. The organopolysiloxane constituent in the emulsion [A2], which had nonflowable soft gel-like consistency, consisted of the $Me_2SiO_{2/2}$ units and $ViSiO_{3/2}$ units in a molar ratio of 100:0.3 corresponding to 0.15% by moles of the vinyl groups in the total content of methyl and vinyl groups. The molecular chain ends of this organopolysiloxane could be assumed to be blocked each with a silanolic hydroxyl group.

PREPARATORY EXAMPLE 3

Into a polyethylene beaker of 2 liters capacity were introduced 495 g of octamethylcyclotetrasiloxane, 5 g of phenyltriethoxysilane and 100 g of a 10% aqueous solution of dodecylbenzenesulfonic acid and the mixture in the beaker was agitated with a homomixer to give a uniform emulsion which was then diluted by gradually adding 400 g of water under agitation. The thus diluted emulsion was passed twice through a high-pressure homogenizer under a pressure of 300 kg/cm² to give a uniform and stable aqueous emulsion.

This aqueous emulsion was transferred into a glass flask of 2 liters capacity equipped with a stirrer, thermometer and reflux condenser and agitated therein for 24 hours at 50° C. to effect polymerization followed by aging for 24 hours at 10° C. and neutralization by the addition of 5.7 g of a 10% aqueous ammonia to give a pH value of 7.5. The thus obtained aqueous emulsion is referred to as the emulsion [A3] hereinafter.

This emulsion [A3] contained 45.8% of non-volatile matters as determined by heating for 3 hours at 105° C. in a hot-air oven. The organopolysiloxane constituent in the emulsion [A3], which had non-flowable soft gel-like consistency, consisted of the $Me_2SiO_{2/2}$ units and $PhSiO_{3/2}$ units in a molar ratio of 100:0.3. The molecular chain ends of this organopolysiloxane could be assumed to be blocked each with a silanolic hydroxyl group.

PREPARATORY EXAMPLE 4

Into a solution of 154 g of maleic anhydride dissolved in 500 g of ethyl alcohol were added 346 g of 3-aminopropyltriethoxysilane dropwise taking 1 hour at room temperature and this reaction mixture was heated at 80° C. under reflux of ethyl alcohol for 24 hours to effect the reaction between maleic anhydride and the amino silane compound. The thus obtained light yellow, clear solution, referred to as the solution [B'] hereinafter, contained 45.1% of non-volatile matters as determined by heating at 105° C. for 3 hours in a hot-air oven.

In the next place, a 160 g portion of the solution [B'] was added under agitation to 600 g of an aqueous colloidal silica dispersion (Snowtex C, a product by Nissan Chemical Co.) containing 20% of colloidal silica particles having a particle diameter of 10 to 20 nm followed by further continued agitation for 30 minutes to give a uniform liquid dispersion, referred to as the dispersion [B1] hereinafter.

PREPARATORY EXAMPLE 5

A uniform mixture of 300 g of dioctyltin dilaurate and 50 g of a polyoxyethylene (10 moles addition of ethylene oxide) nonylphenyl ether was prepared in a polyethylene beaker of 2 liters capacity by agitating with a homomixer and then gradually admixed with 650 g of water under agitation to give an aqueous emulsion which was passed twice through a high-pressure homogenizer under a pressure of 300 kg/cm² to give a stable aqueous emulsion, which is referred to as the catalyst [C1] hereinafter. EXAMPLE 1

An aqueous silicone emulsion was prepared by mixing 444 g of the emulsion [A1] and 190 g of the dispersion [B1] under agitation continued for 30 minutes followed by the addition of 6 g of the catalyst [C1]. A 500 g portion of this emulsion was admixed under agitation with 4 g of carboxymethylcellulose (Cellogen F-SA, a product by Daiichi Kogyo Seiyaku Co.) to give a liquid coating composition having a viscosity of 16,000 centipoise at 25° C. to serve as a surface-coating composition for an air bag base cloth.

A 300 mm wide and 400 mm long rectangular sheet of a substrate cloth taken from a plain-woven cloth of 420 denier 6,6-nylon filaments in a weaving density of 46 counts per inch for each of warp and weft was coated with the thus prepared coating composition by knife coating and the coated cloth sheet was subjected to drying by heating at 100° C. for 2 minutes and then to a curing treatment by heating at 180° C. for 1 minute to give a test sheet of an air bag base cloth, which was subjected to the test of burning velocity according to the procedure specified in the FMVSS-302 method in the following manner to obtain a value of 55 mm/minute. The coating amount of the surface-coated air bag base cloth was 30 g/m² as dried and cured.

Thus, a test piece of 100 mm width and 350 mm length provided with two benchmark lines A and B at a distance of 38 mm and 292 mm, respectively, along the longer side of the piece from one end was held horizontally in a slack-free fashion by means of a U-shaped clamp. A gas burner flame was applied to this test piece for 15 seconds at about the center position between the end line and the benchmark line A to start burning of the test specimen. Measurement was made for the time from the moment when the propagating front of the flame arrived at the benchmark line A to the moment when the flame front arrived at the benchmark line B to calculate the burning velocity in mm/minute. A test piece is acceptable relative to flame retardancy when the burning velocity for flame propagation thus determined does not exceed 101 mm/minute.

EXAMPLE 2

The experimental procedure was just the same as in Example 1 excepting for the replacement of the emulsion [A1] with the same amount of the emulsion [A2] in the preparation of the aqueous silicone emulsion composition. The coating amount of the air bag base cloth with the composition was 30 g/m² as dried and cured.

The result of the burning velocity test of the surface-coated air bag base cloth was 65 mm/minute.

COMPARATIVE EXAMPLE

The experimental procedure was just the same as in Example 1 excepting for the replacement of the emulsion

[A1] with the same amount of the emulsion [A3] in the preparation of the aqueous silicone emulsion composition. The coating amount of the air bag base cloth with the composition was 30 g/m² as dried and cured.

The result of the burning velocity test of the surface-coated air bag base cloth was 105 mm/minute.

What is claimed is:

1. An aqueous silicone emulsion composition which is a uniform blend of the ingredients comprising:
   (A) 100 parts by weight of an aqueous base emulsion of an organopolysiloxane consisting of
      (A1) from 10 to 70% by weight of an organopolysiloxane having silicon-bonded monovalent hydrocarbon groups and at least two hydroxyl groups bonded to the silicon atoms in a molecule, in which from 0.01 to 10% by moles of the monovalent hydrocarbon groups are alkenyl groups,
      (A2) from 0.01 to 10% by weight of an anionic surface active agent, and
      (A3) the balance of water;
   (B) from 1 to 60 parts by weight of an aqueous dispersion consisting of
      (B1) from 5 to 50% by weight of a solution containing, in an at least partly water-miscible organic solvent, from 10 to 90% by weight of a reaction product between an amino group-containing hydrolyzable organosilane compound or a partial hydrolysis product thereof and a polycarboxylic acid anhydride, and
      (B2) from 50 to 95% by weight of an aqueous colloidal silica dispersion containing from 10 to 50% by weight of colloidal silica particles; and
   (C) from 0.01 to 10 parts by weight of a curing catalyst.

2. The aqueous silicone emulsion composition as claimed in claim 1 in which the monovalent hydrocarbon group in the component (A1) has from 1 to 20 carbon atoms.

3. The aqueous silicone emulsion composition as claimed in claim 1 in which the alkenyl group in the component (A1) is selected from the group consisting of vinyl, allyl, butenyl, pentenyl and hexenyl groups.

4. The aqueous silicone emulsion composition as claimed in claim 1 in which from 0.05 to 5% by moles of the monovalent hydrocarbon groups in the component (A1) are alkenyl groups.

5. The aqueous silicone emulsion composition as claimed in claim 1 in which the organopolysiloxane as the component (A1) has a viscosity of at least 100,000 centipoise at 25° C.

6. The aqueous silicone emulsion composition as claimed in claim 1 in which the anionic surface active agent as the component (A2) is selected from the group consisting of organic sulfonates, higher alcohol sulfates, ethoxylated higher alcohol sulfates, alkylphenyl ether sulfates, ethoxylated alkylphenyl ether sulfates, higher alcohol phosphates and ethoxylated higher alcohol phosphates.

7. The aqueous silicone emulsion composition as claimed in claim 1 in which the amount of the organopolysiloxane as the component (A1) in the ingredient (A) is in the range from 30 to 60% by weight.

8. The aqueous silicone emulsion composition as claimed in claim 1 in which the amount of the anionic surface active agent as the component (A2) in the ingredient (A) is in the range from 0.1 to 5% by weight.

9. The aqueous silicone emulsion composition as claimed in claim 1 in which the amino group-containing hydrolyzable organosilane compound is represented by the formula $$R^1{}_m R^2{}_n Si(OR^3)_{4-m-n},$$

in which $R^1$ is an unsubstituted or N-substituted aminoalkyl group represented by the formula $—(—CH_2—)_a—(—NR^4—CH_2CH_2—)_b—NR^5R^6$, $R^4$, $R^5$ and $R^6$ each being, independently from the others, a hydrogen atom or a monovalent hydrocarbon group having 1 to 10 carbon atoms with the proviso that at least one of $R^4$, $R^5$ and $R^6$ is a hydrogen atom, the subscript a being a positive integer not exceeding 6 and the subscript b being 0 or a positive integer not exceeding 3, $R^2$ is a monovalent hydrocarbon group having 1 to 20 carbon atoms, $R^3$ is a monovalent hydrocarbon group having 1 to 6 carbon atoms, the subscript m is 1, 2 or 3 and the subscript n is 0, 1 or 2 with the proviso that m+n is 1, 2 or 3.

10. The aqueous silicone emulsion composition as claimed in claim 9 in which the amino group-containing hydrolyzable organosilane compound is selected from the group consisting of: 3-aminopropyltri-ethoxysilane; 3-(2-aminoethyl)aminopropyltrimethoxysilane; 3-[2-(2 aminoethyl)aminoethyl]aminopropyltrimethoxysilane; 3-aminopropylmethyldiethoxysilane; 3-(2-aminoethyl)aminopropylmethyldimethoxysilane; and 3-[2-(2-aminoethyl)aminoethyl]aminopropylmethyldimethaminoethyl) aminoethyl] aminopropylmethyldimethoxysilane.

11. The aqueous silicone emulsion composition as claimed in claim 10 in which the amino group-containing hydrolyzable organosilane compound is 3-aminopropyltriethoxysilane.

12. The aqueous silicone emulsion composition as claimed in claim 1 in which the polycarboxylic acid anhydride is selected from the group consisting of maleic anhydride, succinic anhydride, glutaric anhydride, phenylmaleic anhydride, chlorendic anhydride, phthalic anhydride, hexahydrophthalic anhydride, trimellitic anhydride and pyromellitic anhydride.

13. The aqueous silicone emulsion composition as claimed in claim 12 in which the polycarboxylic acid anhydride is maleic anhydride.

14. The aqueous silicone emulsion composition as claimed in claim 1 in component (B1) is the product of a reaction between an amino group-containing hydrolyzable organosilane compound and a polycarboxylic acid anhydride in such a proportion that from 0.5 to 2 moles of amino groups are provided per mole of the polycarboxylic acid anhydride.

15. The aqueous silicone emulsion composition as claimed in claim 1 in which the colloidal silica particles in the component (B2) have a particle diameter in the range from 5 to 50 nm.

16. The aqueous silicone emulsion composition as claimed in claim 1 in which the ingredient (B) consists of from 10 to 30% by weight of the component (B1) and from 90 to 70% by weight of the component (B2).

17. The aqueous silicone emulsion composition as claimed in claim 1 in which the amount of the ingredient (B) is in the range from 10 to 50 parts by weight per 100 parts by weight of the ingredient (A).

18. The aqueous silicone emulsion composition as claimed in claim 1 in which the ingredient (C) is selected from the group consisting of dibutyltin dilaurate, dibutyltin dioctoate, dioctyltin dilaurate, dioctyltin diacetate, tin octoate, zinc stearate, zinc octoate, zinc acetate, iron octoate, n-hexylamine and guanidine.

19. The aqueous silicone emulsion composition as claimed in claim 1 in which the amount of the ingredient (C) is in the range from 0.1 to 5 parts by weight per 100 parts by weight of the ingredient (A).

20. A method for the preparation of a base cloth for automobile air bags which comprises the steps of:
  i) coating at least one surface of a substrate cloth with the aqueous silicone emulsion composition defined in claim 1 to form a coating layer;
  ii) drying the coating layer by heating to form a dried coating layer; and
  iii) curing the dried coating layer by a heat treatment.

21. The method for the preparation of a base cloth for automobile air bags as claimed in claim 20 in which coating of the substrate cloth with the aqueous silicone emulsion composition in step i) is performed by a method of knife coating, roller coating, spray coating or dip coating.

22. The method for the preparation of a base cloth for automobile air bags as claimed in claim 21 in which coating of the substrate cloth with the aqueous silicone emulsion composition in step i) is performed by a method of knife coating or roller coating.

23. The method for the preparation of a base cloth for automobile air bags as claimed in claim 20 in which step i) is preceded by adjusting the viscosity of the aqueous silicone emulsion composition to be in the range from 2,000 to 100,000 centipoise at 25° C.

24. The method for the preparation of a base cloth for automobile air bags as claimed in claim 23 in which the viscosity of the aqueous silicone emulsion composition after adjustment is in the range from 10,000 to 50,000 centipoise at 25° C.

25. The method for the preparation of a base cloth for automobile air bags as claimed in claim 23 in which adjustment of the viscosity of the aqueous silicone emulsion composition is conducted by the addition of a water-soluble polymeric thickening agent to the composition.

26. The method for the preparation of a base cloth for automobile air bags as claimed in claim 25 in which the water-soluble polymeric thickening agent is selected from the group consisting of carboxymethylcellulose, poly (sodium acrylate), starch, casein, cellulose acetate, hydroxyethyl cellulose and polyvinyl alcohol.

27. The method for the preparation of a base cloth for automobile air bags as claimed in claim 26 in which the water-soluble polymeric thickening agent is carboxymethylcellulose.

28. A base cloth for automobile air bags which comprises:
  (1) a substrate cloth; and
  (2) a cured coating layer formed on at least one surface of a substrate cloth from the aqueous silicone emulsion composition defined in claim 1 in a coating amount in the range from 10 to 100 g/m$^2$ on the solid basis.

29. The base cloth for automobile air bags as claimed in claim 28 in which the coating amount is in the range from 20 to 50 g/m$^2$ on the solid basis.

30. The aqueous silicone emulsion as claimed in claim 1, wherein at least 50% by moles of the silicon-bonded monovalent hydrocarbon groups are methyl groups.

31. The aqueous silicone emulsion as claimed in claim 3, wherein the alkenyl group of component (A1) is a vinyl group.

32. The aqueous silicone emulsion as claimed in claim 1, wherein from 0.1 to 2% by moles of the monovalent hydrocarbon groups in (A1) are alkenyl groups.

33. The aqueous silicone emulsion as claimed in claim 5, wherein said viscosity is at least 1,000,000 centipoise at 25° C.

34. The aqueous silicone emulsion as claimed in claim 1, wherein the aqueous silica dispersion of (B2) contains 20 to 40% by weight of colloidal silica particles.

* * * * *